(12) United States Patent
Jacques

(10) Patent No.: US 7,158,840 B2
(45) Date of Patent: Jan. 2, 2007

(54) TUNING CONTROL PARAMETERS OF VIBRATION REDUCTION AND MOTION CONTROL SYSTEMS FOR FABRICATION EQUIPMENT AND ROBOTIC SYSTEMS

(75) Inventor: Robert Jacques, Andover, MA (US)

(73) Assignee: Cymer, Inc., San Diego, CA (US)

( * ) Notice: Subject to any disclaimer, the term of this patent is extended or adjusted under 35 U.S.C. 154(b) by 647 days.

(21) Appl. No.: 09/896,689

(22) Filed: Jun. 29, 2001

(65) Prior Publication Data

US 2003/0028266 A1 Feb. 6, 2003

(51) Int. Cl.
G05B 13/02 (2006.01)

(52) U.S. Cl. ............................. 700/28; 700/29; 700/31; 700/37

(58) Field of Classification Search ................ 700/193, 700/28, 44, 65, 262, 32, 52, 54, 55, 29–31, 700/37–39, 47; 324/727; 709/224; 714/25; 73/664; 318/568, 22; 703/2
See application file for complete search history.

(56) References Cited

U.S. PATENT DOCUMENTS

| | | | |
|---|---|---|---|
| 3,767,900 A * | 10/1973 | Chao et al. .................... 700/31 |
| 4,916,635 A | 4/1990 | Singer et al. ................ 364/513 |
| 4,973,215 A | 11/1990 | Karlen et al. ................ 414/729 |
| 5,144,595 A * | 9/1992 | Graham et al. .............. 367/135 |
| 5,167,002 A | 11/1992 | Fridhandler .................. 388/815 |
| 5,268,625 A * | 12/1993 | Plummer ...................... 318/610 |
| 5,367,612 A | 11/1994 | Bozich et al. ................. 395/22 |
| 5,386,372 A | 1/1995 | Kobayashi et al. .......... 364/574 |
| 5,426,720 A | 6/1995 | Bozich et al. ................. 395/22 |
| 5,491,446 A | 2/1996 | Okada et al. ................. 327/551 |
| 5,581,166 A | 12/1996 | Eismann et al. ........ 318/568.22 |
| 5,594,309 A | 1/1997 | McConnell et al. ... 318/568.22 |
| 5,604,413 A | 2/1997 | Khorrami et al. ............ 318/632 |
| 5,610,848 A | 3/1997 | Fowell ................... 364/724.07 |
| 5,638,305 A | 6/1997 | Kobayashi et al. .......... 364/574 |
| 5,691,896 A * | 11/1997 | Zou et al. ....................... 700/37 |
| 5,816,122 A | 10/1998 | Benning et al. .............. 82/1.11 |
| 5,845,236 A | 12/1998 | Jolly et al. ................... 702/195 |
| 5,946,449 A | 8/1999 | Dickerson et al. ............. 395/95 |
| 5,960,969 A | 10/1999 | Habisohn ..................... 212/275 |
| 5,991,525 A * | 11/1999 | Shah et al. ..................... 703/2 |
| 6,002,232 A | 12/1999 | McConnell et al. ......... 318/629 |

(Continued)

FOREIGN PATENT DOCUMENTS

WO 91/18271 11/1991

(Continued)

OTHER PUBLICATIONS

Jacques, "On-line System Identification and Control Design for Flexible Structures," (pp. 1-275), May 1994, Massachusetts Institute of Technology, Department of Aeronautics and Astronautics.

(Continued)

Primary Examiner—Anthony Knight
Assistant Examiner—Ronald D. Hartman, Jr.
(74) Attorney, Agent, or Firm—William Cray

(57) ABSTRACT

A method and apparatus is disclosed for acquiring and processing parameters used to adjust and tune a controller used, for example, to govern and compensate for motion, including vibrations and disturbances, in a physical system, such as a piece of manufacturing equipment. The method and apparatus may also be used to control, for example, a robot or other spatially dependent machine. The method and apparatus may comprise systems and methods for generating a controller, and for controlling motion in a physical system or apparatus.

66 Claims, 7 Drawing Sheets

U.S. PATENT DOCUMENTS

| | | | | |
|---|---|---|---|---|
| 6,011,373 | A | 1/2000 | McConnell et al. | 318/560 |
| 6,076,951 | A | 6/2000 | Wang et al. | 364/158 |
| 6,078,844 | A | 6/2000 | Magee et al. | 700/55 |
| 6,102,221 | A | 8/2000 | Habisohn | 212/270 |
| 6,128,541 | A * | 10/2000 | Junk | 700/39 |
| 6,207,936 | B1 * | 3/2001 | de Waard et al. | 219/497 |
| 6,249,712 | B1 * | 6/2001 | Boiquaye | 700/31 |
| 6,285,971 | B1 | 9/2001 | Shah et al. | 703/2 |
| 6,577,908 | B1 * | 6/2003 | Wojsznis et al. | 700/42 |
| 6,904,422 | B1 * | 6/2005 | Calise et al. | 706/23 |
| 2001/0003112 | A1 | 6/2001 | Kirchner | 492/16 |
| 2002/0099677 | A1 * | 7/2002 | Calise et al. | 706/23 |
| 2002/0099724 | A1 * | 7/2002 | Harmse | 707/200 |

FOREIGN PATENT DOCUMENTS

| | | |
|---|---|---|
| WO | 00/41043 | 7/2000 |

OTHER PUBLICATIONS

Singhose; Mills, "Command Generation Using Specified-Negative-Amplitude Input Shapers," (pp. 61-65), Jun. 1999, Proceedings of the American Control Conference.

Li; Rahn, "Adaptive Vibration Isolation for Axially Moving Beams," (pp. 419-428), Dec. 2000, IEE/ASME Transactions on Mechatronics, vol. 5. No. 4.

Qu, "Robust and Adaptive Boundary Control of a Stretched String on a Moving Transporter," Mar. 2001, (pp. 470-476), IEEE Transactions on Automatic Control, vol. 46, No. 3.

Baz; Hong, "Adaptive Control of Flexible Structures Using Modal Positive Position Feedback," May 1997, (pp. 231-253), L Journal of Adaptive Control and Signal Processing, vol. 11.

Yen, "Active Vibration Control in Precision Structures," Apr. 1997, (pp. 127-135), SPIE, Applications and Science of Artificial Neural Networks III, vol. 3077.

Gopinathan, Pajunen, Neelakanta, Arockiasamy, "Linear Quadratic Distributed Self-Tuning Control of Vibration in a Cantilever Beam," (pp. 542-553), SPIE, vol. 2443.

Davis, "Adaptive Neural Control for the ASTREX Testbed," 1997, (pp. 1794-1798), Proceedings of the American Control Conference.

Fitch, Maybeck, "Multiple Model Adaptive Control of a Large Flexible Space Structure with Purposeful Dither for Enhanced Indentifiability," Dec. 1994, (pp. 2904-2909), Proceedings of the 33 rd Conference on Decision and Control.

Schiller, Maybeck, Control of a Large Space Structure Using MMAE/MMAC Techniques, Oct. 1997, (pp. 1122-1131), IEEE Transactions on Aerospace and Electronic Systems, vol. 33, No. 4.

Goodwin, Welsh, "Analysis of a Novel Method of Autotuning a Multivariable Plant Based on Quantisation," Jun. 1999, (pp. 3347-3351), Proceedings of the American Control Conference.

Bodson, Douglas, "Narrowband Disturbance Rejection using Adaptive Feedback Algorithms," Mar. 1997, (pp. 45-56), SPIE—Mathematics and Control in Smart Structures, vol. 3039.

Bodson, Douglas, "Rejection of Disturbances with a Large Sinusoidal Component of Unknown Frequency," Feb. 1996, (pp. 64-75), SPIE—Mathematics and Control in Smart Structures. vol. 2715.

Wang, Hang, Zou, "A Frequency Response Approach to Autotuning of Multivariable Controllers," Nov. 1997, (pp. 797-806), Trans IChemE, vol. 75, Part A.

Bakker, Annaswamy, "Low-order Multivariable Adaptive Control with Application to Flexible Structures," Mar. 1996, (pp. 409-417), A Journal of IFAC the International Federation of Automatic Control, vol. 32, No. 3.

Annaswamy, Clancy, "Adaptive Control Strategies for Flexible Space Structures," Jul. 1996, (pp. 952-966), IEEE Aerospace and Electronic Systems Society, vol. 32, No. 3.

Ho, Yang, Chew, "New Adaptable Reference Model Adaptive Control for Slewing Control of a Flexible Beam with An Unknown Tip-load," Feb.-Mar. 1995, (pp. 739-751), SPIE—Smart Structures and Integrated Systems, vol. 2443.

Astrom, Wittenmark, "Commercial Products and Applications," 1995, (pp. 375-389; 499-517), Adaptive Control, Second Edition.

* cited by examiner

TUNING CONTROL PARAMETERS OF VIBRATION REDUCTION AND MOTION CONTROL SYSTEMS FOR FABRICATION EQUIPMENT AND ROBOTIC SYSTEMS

FIELD OF THE INVENTION

The invention relates to the tuning of control parameters relating to vibration reduction and motion control systems, suitable for use for use in, for example, the control of manufacturing equipment and robotic systems.

BACKGROUND OF THE INVENTION

The ability to accurately and controllably reduce vibration, and to otherwise precisely control motion, is a coveted capability useful in governing the behavior of a wide variety of manufacturing processes and equipment. For example, it is well-known that semiconductor capital equipment, such as lithography stages, laser light sources, metrology stages, pick-and place-equipment and wafer-handling robots, must operate within specifically calibrated, relatively fault-intolerant operational ranges of movement and other physical conditions. Beyond these ranges, the products produced by such equipment, and the equipment itself, may be defective or nonfunctional.

Indeed, semiconductor chip manufacture can be so sensitive, that tiny ranges of unwanted motion, for example, in the micrometer ($\mu$m) to nanometer (nm) range, can interfere with components or subsystems that require precise alignment and positioning. The need for such near-exacting precision in chip manufacturing is illustrated, for instance, in the careful matching of a wafer mask to a silicon substrate. Because, in this context, small variances in mask placement may escape detection until the quality control inspection, or worse, until installation in end-products, the need for identifying and quickly correcting the effect of positioning and disturbance-related errors in the first place is of utmost importance.

As chip-making technology has advanced, for example, through the use of advanced photolithography lasers such as those sold by Cymer, Inc. of San Diego, Calif., chip throughput requirements have also increased. One consequence of the increased requirements has been a larger positioning bandwidth of photolithography stages. However, with greater bandwidth has come increases in the attendant motion or stage control issues. For example, among other effects upon manufacturing, the increase in positioning bandwidth has implicated the need to predict and control flexible deformation modes of stages into the control band of the system. This, coupled with the typical stage's relatively low level of structural damping (arising from the requirement that the stages be both light and stiff), creates a host of scenarios where the stage must be carefully controlled to achieve sustained, near-optimal operational behavior. Here again, the need for highly precise control is keenly felt.

Any control system used in such situations should ideally be capable of tuning itself to maximize system performance in the presence of these variations. Also, since optimality of the control system is dependent on magnitude, frequency response, and other characteristics of system disturbances, the control system preferably should notice, adjust and, if necessary, compensate for and overcome unwanted effects of the disturbances.

Active vibration and motion control provides one promising method of achieving adequate system governance. Active control is often a suitable technology for dealing with vibration and motion control issues for a number of reasons, such as those discussed in commonly-owned U.S. Ser. No. 09/491,969, which is hereby incorporated by reference. However, unknowns in plant dynamics and unforeseen disturbances to the system being controlled can significantly alter the actual results attained through active structural control, especially when used with sensitive machines such as semiconductor capital equipment. In this context, disturbances can manifest themselves in a variety of ways, such as affecting the signals input to the system being controlled, causing variances in sensor signals or by impacting performance variables. In addition, uncertainty in stage dynamics, and the impact upon those dynamics caused by changes in equipment configuration, mass distribution, and aging of equipment, subsystems, or components, all may serve to limit the performance of any standard control method chosen.

The shortcomings of active control are especially appreciated when taken from a predictable laboratory setting to the rigors of the factory floor. In laboratory tests, one can characterize the system being controlled, including experimentally induced disturbances, before closing the loops and then adjust the control gains to get the best possible response out of the system. In this manner, it is possible to eliminate much of the uncertainty about a system's input/output behavior in a specified frequency range, especially when using modern system identification techniques. In real world applications, however, it is more difficult to recreate system performance identical to that observed in the lab. Part-to-part variation results in differences in response to control inputs, even between nominally identical systems, and even when using the same controller. Changes in environment and equipment configuration can cause sometimes difficult to pinpoint modeling errors because they can vary from location to location and may also vary with time. These issues often arise in the case of semiconductor fabrication equipment, where the dynamics of the individual system may not be completely known until it has been deployed and used in the factory. Furthermore, the exact character of a disturbance in physical conditions, let alone specific disturbance frequencies, may not be known ahead of time with the precision needed to optimize performance and can be time-varying themselves.

Researchers have been addressing these issues outside of the semiconductor industry by applying adaptive control techniques to the structural control problem. The thrust of these efforts has been to make the adaptive control algorithms as general as possible, with the goal of making a controller which uses an unchanging theoretical model to work for all conceivable systems under all conditions. Such an ideal controller usually is necessarily (and undesirably) complex for most practical applications and, in use, may limit the performance of the controller. In addition, if the model of the plant changes as a function of time, the performance of the controller may be limited if these changes are not captured in the model.

Some research in the area of adaptive control has focused on its application to flexible structures. Roughly, the favored approaches of these efforts can be divided into three classes of feedback control: direct adaptive control, self tuning regulators, and tonal controllers. The direct adaptive controllers compute control gains "adaptively", i.e., directly from measurement errors. In general, these types of controllers guarantee stability via Lyapunov theory. However, direct controllers usually require that actuators and sensors be collocated and dual to enforce a positive real condition in the transfer functions. In practice, it is often difficult to construct sensor/actuator pairs that yield truly positive real behavior. Either non-idealities, such as amplifier dynamics, violate the condition, or the collocation of actuators and sensors forces an unsatisfactory reduction in closed-loop performance.

Tonal controllers are those designed to perform disturbance rejection at one or several discrete frequencies. The disturbance is usually a sinusoid, usually of unknown frequency. The tonal controller typically either adapts to changes in frequency, changes in plant dynamics, or both. This type of control can achieve perfect disturbance rejection (even in non-positive-real systems) in instances where the number of error sensors is less than or equal to the number of actuators and the actuators have sufficient control authority. Self tuning regulators add an extra step to the adaptation process, namely, the adaptive updating of an internal model in the tuning algorithm. This model is used to compute control gains. These methods generally do not require collocation, and are distinguished from each other primarily by the algorithm used to perform identification (ID) of the internal model. Among the ID methods used in these types of controllers are neural nets, modal parameters, physical structural properties (e.g. mass and stiffness) and families of models that span the parameter variation space.

Generally, existing self tuning regulators exhibit several shortcomings that hamper their utility. For example, existing regulators update the controller (and the internal model associated therewith) at each controller cycle. As such, the computations required to ensure stability of the controller's operation are complex and burdensome. In application, there are times when these computations cannot be adequately performed during each controller cycle, such as when the equipment being regulated demands relatively high bandwidth control. In addition, because the equipment being regulated is in operation i.e., "normal use," while tuning data is acquired, it is undesirable and, sometimes impossible, to inject any alternative "test" actuation signals into the system; thus, any self tuning is solely dependent upon the existing operating signals. The result is that there are times where these operating signals do not adequately excite the dynamics of the plant to a level necessary to obtain a high fidelity model of the plant dynamics. Since a controller, to some degree, is only as good as the plant model upon which it depends, model fidelity can directly limit the performance of the controller. Thus, in order to better characterize the plant, the ability to introduce an alternative excitation signal would be desirable.

Attempting to tune controller parameters during system operation is an additional layer of complexity that is frequently excessive and unnecessary to most manufacturing applications. Indeed, many of the advantages of adaptive control, without the limitations imposed by non-linear stability requirements, can be realized by occasionally taking a manufacturing machine off-line i.e., "abnormal use," to gather system data and tune the controller parameters based on the new data. This concept of tuning control parameters at infrequent intervals to improve performance of feedback control systems has been implemented in the context of tuning a proportional plus-integral-plus-derivative (PID) controller. Recent work extends PID auto-tuning concepts to multivariable systems, albeit systems with a few degrees of freedom or states, usually only suitable for measuring a maximum of three parameters: frequency, amplitude, and phase of a signal. Since only three parameters are measured, it is only possible to modify a controller for a system that is a second order (or lower) dynamic system. This constraint hampers the usefulness of this method.

Moreover, it is typically only possible to apply this method to single-input, single-output PID controllers, making it poorly suited for dynamically complex multi-input, multi-output systems typical of semiconductor manufacturing equipment. Manufacturing equipment often requires more than about 16, and sometimes as many as 32 or more, states to accurately model the system and to control it adequately. Other work has extended the concept to multivariable systems, and employs the use of non-linear curve fitting to match models to frequency response measurements. That work, however, has been generally limited to large flexible structures, such as spacecraft, and used several very high powered computers, including a Cray supercomputer, to implement the algorithms. Also, it assumed that transfer functions from disturbances and from actuators to performance variables could be measured. In addition, the prior work required the creation of unique mathematical filters for every given system configuration, which in turn required the services of a computer programmer to effectively create new software unique to any given control situation. As a result, prior attempts to tune control parameters in an off-line scenario have required large amounts of experimental data and significant amounts of processing time at uncommon processing speeds to achieve results. Such methods, using specialized equipment and expertise, proves to be impractical in a typical manufacturing setting for all but the most time- and cost-insensitive applications.

Other prior systems and methods further demonstrate the need for a practical, novel approach to self-tuning regulators. For example, tuning of a portion of a control system is practiced by McConnell et al. in U.S. Pat. Nos. 6,011,373 and 6,002,232, and Singer, et al. in U.S. Pat. No. 4,916,635. However, the adjustment performed is considered to be command shaping. In these scenarios, adjustment of the input commands is performed rather than adjustment of the feedback controller used to regulate the operation of the system. This adjustment to the input command is in response to errors measured from previous input commands. The disadvantage of this method is that it does not address external disturbances.

McConnell et al. discloses the use of time domain measurements to update a single input, single output open loop controller in U.S. Pat. No. 5,594,309. However, this system only provides for adjustment of the input filter used to command the point-to-point movement of the system. It does not provide for adjustment of the controller to account for external disturbances or for trajectory following. Dickerson et al. discloses a form of input command adjustment in U.S. Pat. No. 5,946,449, which closely parallels the adjustment performed by Dickerson et al.

In U.S. Pat. No. 6,076,951, Wang et al. disclose a system that employs relay feedback or step input, where a linear least squares curve fit is employed to derive the desired controller. In this case, a direct inversion of the desired closed loop performance is conducted. The controller structure and gains are derived directly from a system identification fit of the closed loop performance using a polynomial parameterization of the control. This method has poor numeric conditioning and, as such, usually will not converge to the correct model for large order (i.e., greater than 10 states) systems. In addition, the use of a step or relay input to the system does not always provide enough information about the dynamic behavior of the plant.

WO 00/41043 by Tan et al. discloses a system that provides for adjustment of gain values for a PI controller using time domain data to determine how to adjust the system. This disclosure does not address updating of model parameters, but rather, requires that the model be known. As such, the performance of the system is not robust to variations in the plant.

SUMMARY OF THE INVENTION

In accordance with the present invention, there are provided systems and methods that address the shortcomings of prior controller tuning and motion control attempts, with a minimum addition of hardware.

Thus, according to one aspect of the invention, a system is provided to govern the behavior of a controller used to dictate motion of a machine component. The system includes a sensor that measures data that accurately characterizes the physical behavior of the component. The sensor takes its data reading when the component is not in normal use. The system also includes a processor which dynamically generates a fully coupled mathematical relation which is multivariable and fully coupled and of minimal order based upon which the controller dictates component motion when the component is in normal use.

According to another aspect of the invention, a system is provided to control the physical behavior of an apparatus. The behavior of the apparatus is estimated by an initial behavioral model. The system includes a sensor element, and a processor capable of generating a drive signal, estimating a updated behavioral model and generating a signal according to the controller used to control the behavior of the apparatus.

According to a third aspect of the invention, a method is provided for governing motion in a physical system by inducing motion in the physical system, measuring frequency response data and updating an initial behavioral model according to the collected data. Appropriate stimulus is applied to the physical system causing motion in the system, thereby causing the system to behave as desired.

According to yet another aspect of the invention, a method is provided for creating an updated model for the behavior of a physical system and for deriving optimal controllers based on the updated model

DETAILED DESCRIPTION

Figure 1:
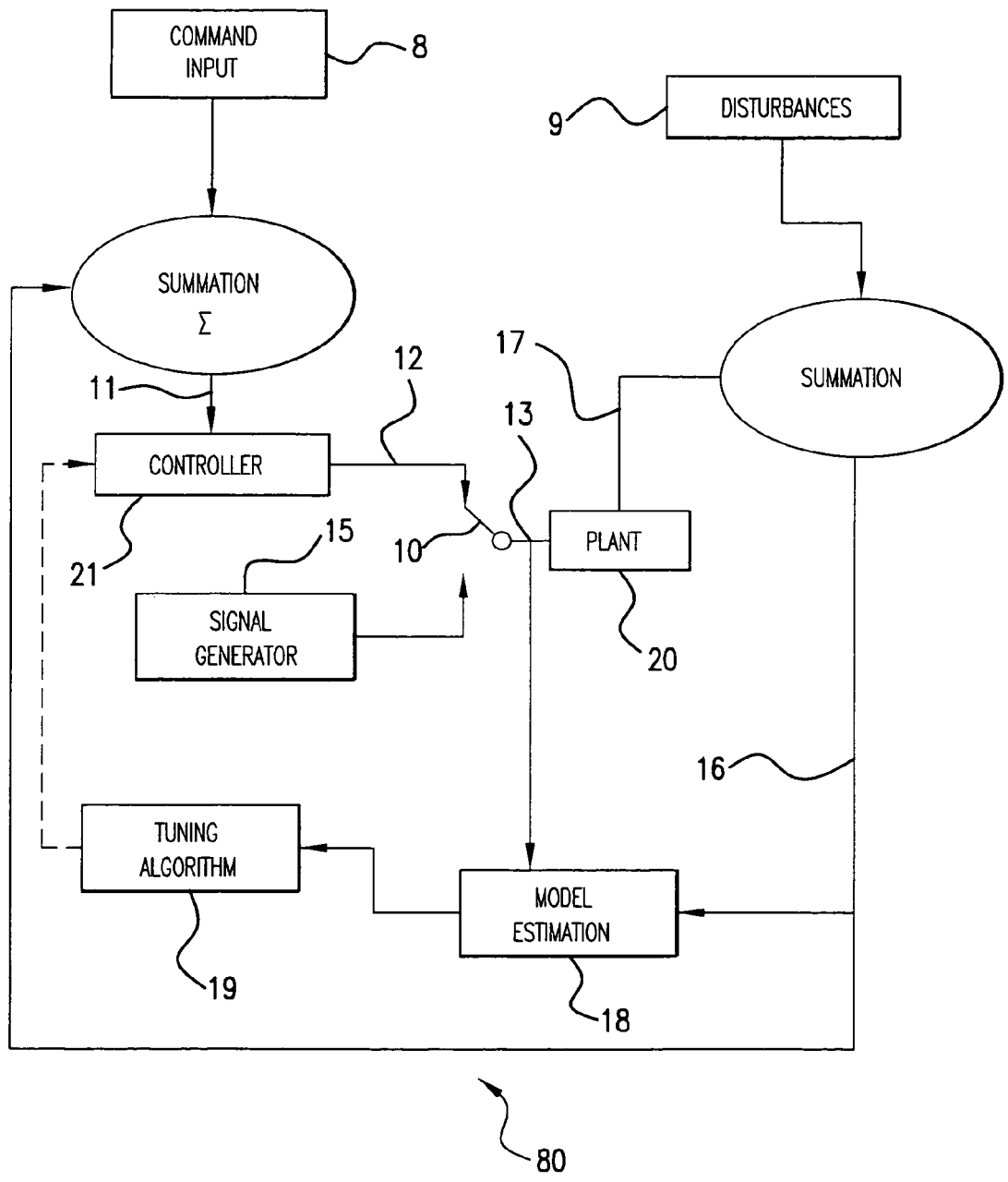
FIG. 1 is a schematic illustration of a control system according to the present invention in which tuning is implemented.

The systems and methods of the invention extend, for example, to fabrication equipment and robotic systems and to dealing with servo and tracking problems. The invention, in one regard, contemplates its application to command following, and does so in a sufficiently timely manner to allow it to be implemented in a typical semiconductor fabrication facility, although the invention is equally applicable to other scenarios, such as typical disturbance rejection problems. Thus, according to one aspect of the invention, a motion control system responds to some event, such as an operator command or automated detection of degraded performance by shifting the system into data acquisition mode. Such events, by way of example, might occur simply as a product of routine maintenance and/or daily line or plant shutdowns, or may occur in case of more serious, equipment malfunction-related causes. In this mode, transfer function data is collected by injecting signals into all relevant actuators and taking measurements from all sensors of interest. The data is collected in either an open or closed loop fashion. Using the previous model as an initial guess, the new data is used to update the model parameters. This is done by using non-linear curve fitting techniques to fit the log magnitude and phase of the transfer function data. The system is suited for use with either single input/single output (SISO) or multi input/multi output (MIMO) models. The new model is used to recompute a new controller. In one example, the new controller structure and controller gains are found by re-solving the original optimization problem used to derive the original controller, substituting the new model parameters (gains) and deriving the new controller and its parameters. Typical analytical methods for this are Linear Quadratic Gaussian (LQG), H-infinity, μ-synthesis and hybrids thereof. The new controller is loaded and the controller is restarted.

In addition to the methods and processes encompassed by the invention, at least three new illustrative hardware systems are provided in accordance with the invention. In the first embodiment, feedback control is performed by a digital signal processor (DSP)-based system. The tuning capability is added by attaching the DSP to a host computer via an appropriate interface. System ID data is passed back to the host computer that performs the model tuning and control redesign and passes the new controller back to the DSP. A second embodiment places all functionality for tuning and control redesign on the DSP. A third embodiment includes a second processor located on the DSP board or a daughter board attached to the DSP-based system. Of course, one possessing ordinary skill in the art will appreciate that other hardware configurations that remain within the scope of the invention are possible. For example, in the first embodiment, the host computer could be located off-site and thus the data transfer between the host and the DSP could occur over a communications link, such as an ethernet connection or through the use of a product like CymerOnLine™, also offered by Cymer, Inc.

The present invention also allows for taking a relatively few measurements from the system (such as gain and phase at only a few frequencies) and using this information to directly and accurately modify the control gains of the system (direct adaptation). One instance of this is using several measurements to determine the frequency at which a peak in the modal response occurs and the gain and phase at that peak. The gains of an active damping filter are adjusted to maintain the specified loop gain and phase at the peak.

In systems that have configuration dependent or operating point dependent dynamics, such as robots, the proposed innovation is extremely useful. One existing impediment to implementing gain scheduled controllers in robotics is the amount of time involved to design controllers over a large configuration space. The tuning methodology proposed here would enable the automation of the computation of the gain schedule, thus allowing the operator to formulate one initial controller and allowing a control system according to the invention to iteratively update and refine the controller.

Generally speaking, in order to fully characterize a system of interest, one provides information regarding the physical configuration of the system, e.g., the number and placement of actuators and sensors in relation to system components (the "plant"), as well as information regarding the desired control behavior of the system. This information is then processed to yield a "controller", which is a mathematical command structure according to which the system will be governed. It is important to note that the present invention does not specifically require user-input regarding system disturbances, which often are unforeseen. Thus, the tuning approach according to the invention has several steps, some or all of which are used in different embodiments. These steps generally include system identification, controller updating, control parameter adjustment, and model adjustment.

System Identification

The process of updating an internal model to match measured data is system identification ("ID"). In a one possible embodiment, system ID is performed using transfer function data collected between key actuators and sensors in the system. The logarithmic error between the model and the data is penalized in the optimization using the following relation:

$$\hat{\theta} = \arg\min_{\theta} \sum_{i=1}^{p} \sum_{j=1}^{q} \sum_{k=1}^{N} \left| \log\left( \frac{\hat{G}_{ij}(f_k, \theta)}{G_{ik}(f_k)} \right) \right|^2,$$

where $\theta$ is a vector of parameters which describe the model (usually input by a user, such as a control engineer), $\hat{G}_{ij}(f_k, \theta)$ is the frequency response of the model from actuator j to sensor i measured at frequency $f_k$, $G_{ik}(f_k)$ is the measured frequency response from actuator j to sensor i measured at frequency $f_k$. p is the number of sensors, q is the number of actuators, and N is the number of frequency points of interest. The model is parameterized using a pole-residue form:

$$\hat{G}_{ij}(f, \theta) = \sum_{k=1}^{n} \frac{c_{ik} b_{kj}}{(j2\pi f - p_k)}$$

for continuous time systems.

$$\hat{G}_{ij}(f, \theta) = \sum_{k=1}^{n} \frac{c_{ik} b_{kj}}{(e^{j2\pi fT} - p_k)}$$

for discrete time systems.

where the elements of the parameter vector, .theta., are the coefficients, c.sub.ik, b.sub.kj, and p.sub.k. This parameterization offers two key advantages: 1) it has been demonstrated to have good numeric conditioning; 2) it can represent multivariable systems with minimal order. "Minimal order" in this context means the fewest number and can be coupled fully of states needed to accurately model the behavior of the plant. Of course, other parameterization methods may used instead, such as polynomial parameterization, pole-zero parameterization, and modal parameterization.

The Levenberg-Marquardt algorithm has been demonstrated to be useful in solving this type of curve fitting problem, though other solution methods, including other non-linear curve-fitting methods such as Gauss-Newton, steepest descent and Powell's method, or linear and least squares-type methods, could be used instead. The parameter estimate, $\hat{\theta}$, minimizes the cost function, $J(\theta)$, which can be expressed as a sum of squares of error terms, $p_i(\theta)$.

$$\hat{\theta} = \arg\min_{\theta} J(\theta) = \sum_{i=1}^{nout} \sum_{j=1}^{nin} \sum_{k=1}^{npts} |p_{ijk}(\theta)|^2 = \sum_{1}^{N} |p_i(\theta)|^2$$

The error terms in this case are the logarithmic transfer function error for each actuator, sensor and frequency of interest.

$$p_{ijk}(\theta) = \log\left( \frac{\hat{G}_{ij}(f_k, \theta)}{G_{ij}(f_k)} \right)$$

The parameter estimate is found iteratively. First, define the gradient and Hessian approximations for the cost function, J:

$$J'(\theta) \equiv \begin{bmatrix} \sum \overline{p}_i(\theta) \frac{\partial p_i(\theta)}{\partial \theta_1} \\ \sum \overline{p}_{ii}(\theta) \frac{\partial p_i(\theta)}{\partial \theta_2} \\ \vdots \\ \sum \overline{p}_i(\theta) \frac{\partial p_i(\theta)}{\partial \theta_N} \end{bmatrix}$$

$$J''(\theta) \equiv \begin{bmatrix} \sum_i \sum_j \frac{\partial \overline{p}_i(\theta)}{\partial \theta_1} \frac{\partial p_j(\theta)}{\partial \theta_1} & \sum_i \sum_j \frac{\partial \overline{p}_i(\theta)}{\partial \theta_1} \frac{\partial p_j(\theta)}{\partial \theta_2} & \cdots & \sum_i \sum_j \frac{\partial \overline{p}_i(\theta)}{\partial \theta_1} \frac{\partial p_j(\theta)}{\partial \theta_n} \\ \sum_i \sum_j \frac{\partial \overline{p}_i(\theta)}{\partial \theta_2} \frac{\partial p_j(\theta)}{\partial \theta_1} & \sum_i \sum_j \frac{\partial \overline{p}_i(\theta)}{\partial \theta_2} \frac{\partial p_j(\theta)}{\partial \theta_2} & \cdots & \sum_i \sum_j \frac{\partial \overline{p}_i(\theta)}{\partial \theta_2} \frac{\partial p_j(\theta)}{\partial \theta_n} \\ \vdots & \vdots & \ddots & \vdots \\ \sum_i \sum_j \frac{\partial \overline{p}_i(\theta)}{\partial \theta_n} \frac{\partial p_j(\theta)}{\partial \theta_1} & \sum_i \sum_j \frac{\partial \overline{p}_i(\theta)}{\partial \theta_n} \frac{\partial p_j(\theta)}{\partial \theta_2} & \cdots & \sum_i \sum_j \frac{\partial \overline{p}_i(\theta)}{\partial \theta_n} \frac{\partial p_j(\theta)}{\partial \theta_n} \end{bmatrix}$$

At each iteration, a new search direction is computed by solving the equation:

$$\delta\theta^{(i)} = -(J''(\theta^{(i)}) + \lambda \text{diag}(J''(\theta^{(i)})))^{-1} J'(\theta^{(i)})$$

The parameter, $\lambda$, in this equation is a positive real constant which is varied as the algorithm progresses. As the cost function, J displays more quadratic behavior, the value of the parameter, $\lambda$, is decreased. The parameter vector for the next iteration is found by minimizing the cost function over this search direction:

$$\theta^{(i+1)} = \theta^{(i)} + \delta\theta^{(i)} \operatorname*{argmin}_{\alpha} J(\theta^{(i)} + \alpha \delta\theta^{(i)})$$

The system ID method used in the invention, such as the one described above, offers several advantages. For example, since it is based on transfer function data, the quality of the fit can be adjusted based upon frequency range. Thus, the model can be generated to match the data closely in frequency ranges important for control design (e.g., near the loop gain crossover frequency), and allowed to merely approximate the data in frequency ranges where the model information is not important (i.e. frequencies where the control gains have been rolled off). Another advantage stems from the fact that the algorithm includes log magnitude and phase explicitly in the error function used for curve fitting, quantities that are important to good control design. Yet another advantage of the ID method used in the invention is that the model parameterization, cost function, and curve fitting algorithm together have a very good region of convergence. As a result, the algorithm recovers the optimal fit to the data even when the initial guess has very large errors.

Updating the Controller

Once the model has been updated, it may be desirable to update the controller gains. This is usually done by constructing and solving an optimal control problem, such as is described by a properly formulated Linear Quadratic Gaussian (LQG) problem. A compensator is generated during the solution of this problem by minimizing the following equation:

$$J = E[x^T Q x + u^T R u + x^T N u]$$

when the system is subject to Gaussian white noise on disturbances and sensors. In this equation, x is a state vector of the system, u is a vector of control inputs, and Q, R, and N are state and control weighting matrices. E[] is the expectation operator.

Notably, the information used to create the optimal control problem is the actuator to sensor information. Additionally, it may be desirable to standardize the optimal control problem formulation as much as possible. Toward this end, the inventors have found it possible to reduce specifying the optimal control problem to specifying a finite set of values. A computer program implementing the auto-tuning algorithm reads these values from a file or an alternate communications channel at run-time. Advantageously, this permits a designer to quickly make changes to the optimal control problem formulation, and to observe the effect of these changes in the actual system, without having to recompile the program. This approach is in some regards analogous to being able to download the coefficients specifying a controller at run time.

In practice, keeping with the LQG method by way of example, the design problem is typically specified by describing, or at least estimating, the input/output behavior from all disturbances (including sensor noise), w, and controller outputs, u, to all performance variables (including controller penalty), z, and controller inputs, y. In general, this is done by specifying a state space filter which maps disturbances and controller inputs to performance variables and controller outputs. This filter includes frequency weighting filters used by the designer to adjust the properties of the controller returned by the LQG algorithm as well as the plant dynamics.

Figure 7:
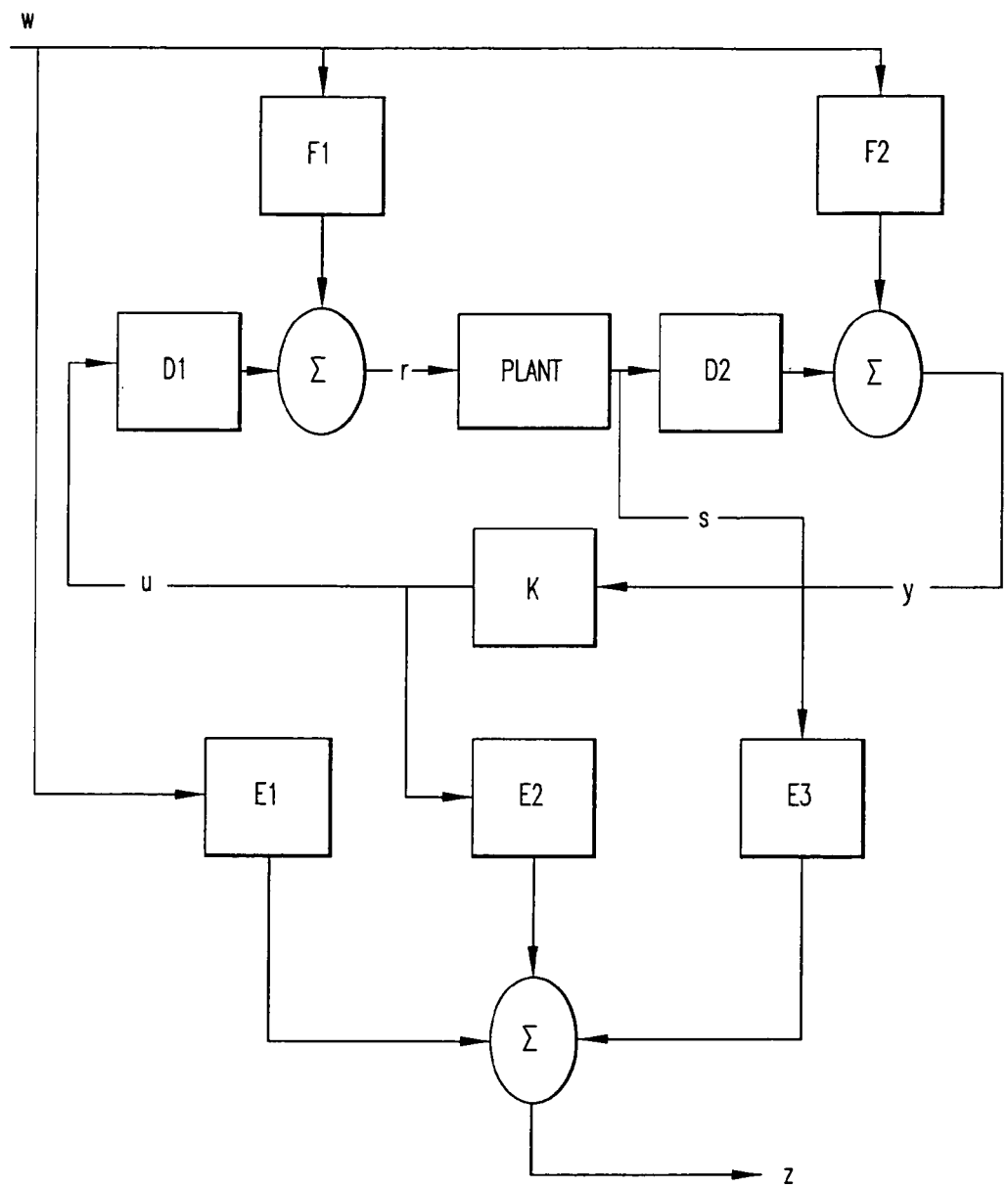
FIG. 7 is a schematic illustration of a method for producing a LQG problem specification according to the invention.

For automated controller design, it is usually necessary to separate the plant dynamics from the frequency weighting filters. FIG. 7 shows the most general way in which an actuator to sensor model can be combined with weighting sensors to produce a full LQG problem specification. This figure uses filters $E_1$, $E_2$, $E_3$, $D_1$, $D_2$, $F_1$, and $F_2$ to specify the relationship between disturbances, w, performance variables, z, controller inputs, y, controller outputs, u, plant inputs, r, and plant outputs, s. Mathematically these relationships are expressed as:

$$z = E_1 w + E_2 u + E_3 s$$

$$r = F_1 w + D_1 u$$

$$y = F_2 w + D_2 s$$

or in more compact form:

$$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

The identified actuator to sensor model and the filter, F, completely describe an LQG problem formulation, and since the solution of the LQG problem is unique, the filter, F, completely describes a mapping from an identified model to a controller. The filter, F, is thus universally applicable, obviating the need for programming a new filter for each configuration of equipment, thus saving time, money, processing power, and computer programmer time. Indeed, to specify this map, the designer only needs to provide the coefficients, i.e., a vector of numbers, describing a state space model of the filter. Alternatively, instead of updating the controller gains as described above, the control parameters themselves may be adjusted using techniques such as non-linear optimization to minimize a more general set of cost functions:

$$J = F(\hat{\theta}, \theta_c)$$

where $\hat{\theta}$ is the vector of model parameters, and $\theta_c$ is a vector of controller parameters. An example of this is multi-model optimization, where the LQG cost function is optimized simultaneously for several different actuator to sensor models. This approach provides a controller which is less sensitive to variations. The multiple models can either be obtained directly from the plant by performing system identification with the plant in different configurations, or it can be obtained by applying parametric variations to a single identified model (such as varying modal frequencies).

Another example where applying non-linear optimization to adjust the control parameters is the case when the LQG problem is as specified above, but the controller order is fixed to be less than the total number of plant and filter states. In this case, the normal LQG solution (which returns a controller with order equal to the total number of plant and filter states), cannot be used. Instead, the optimal controller is found by using iterative search methods.

Alternatively, instead of updating the controller gains as described above, the control parameters may be adjusted using techniques such as non-linear optimization to minimize a more general set of cost functions:

$$J = F(\hat{\theta}, \theta_c)$$

where $\hat{\theta}$ is the vector of model parameters, and $\theta_c$ is a vector of controller parameters.

Additionally, this approach to tuning can be used to adjust the controller directly from the measured data, without performing system ID. In this case, key controller parameters are explicitly made functions of the measured response.

$$\theta_c = H(G_{ij}(f_k), i=1 \ldots p, j=1 \ldots q, k=1 \ldots N)$$

By way of example, this final case of tuning could be useful for updating or tuning positive position feedback (PPF) compensators in which the goal of the controller is to damp out vibration in a piece of manufacturing equipment. Thus according to aspects of an embodiment of the present invention there is disclosed a method of creating a controller of the type employed by a user to govern motion in a physical system comprising the steps of: generating an identification of the system by measuring the response of the system to commands; accepting input from the user specifying certain parameters of the system; applying a universal filter to the input from the user to create a user-defined behavioral range for the physical system; creating a problem specification from the identification of the system and the behavioral range; and solving the problem specification, thereby creating the controller.

FIG. 1 shows a schematic illustration of a control system 80 according to the invention in which tuning is implemented. In normal mode, a switch 10 selects an output 12 of a controller 21 (typically a computer processor) as an input 13 to a plant 20 ("plant" being used herein as a generic term for the system being controlled, such as manufacturing equipment). When the system 80 is switched to tuning mode, the plant input 13 is switched to a function generator 15. Signals going into the plant, i.e., plant input 13, and coming out of the plant, i.e. plant output 17 (from sensors in the plant), including the addition of any system disturbances 9, are analyzed and an internal model of the system is updated to reflect the new data. Model estimation 18 is passed to a tuning algorithm 19, which adjusts or tunes the controller 21 to maximize stability and performance. The updated, or tuned, controller parameters are then installed or written into the controller 21 at, for example, an electronic memory location. Then, the switch 10 is toggled to begin controlling the system in normal operation. As explained above, a first controller 21 based upon a first mathematical model is updated to form a second mathematical model from which a second controller 21 is formed, which second controller is then placed back into the control loop for the system/plant under the control of the controller 21. Thereby, motion induced when a second signal is applied to the mechanical apparatus is well-predicted.

Figure 2:
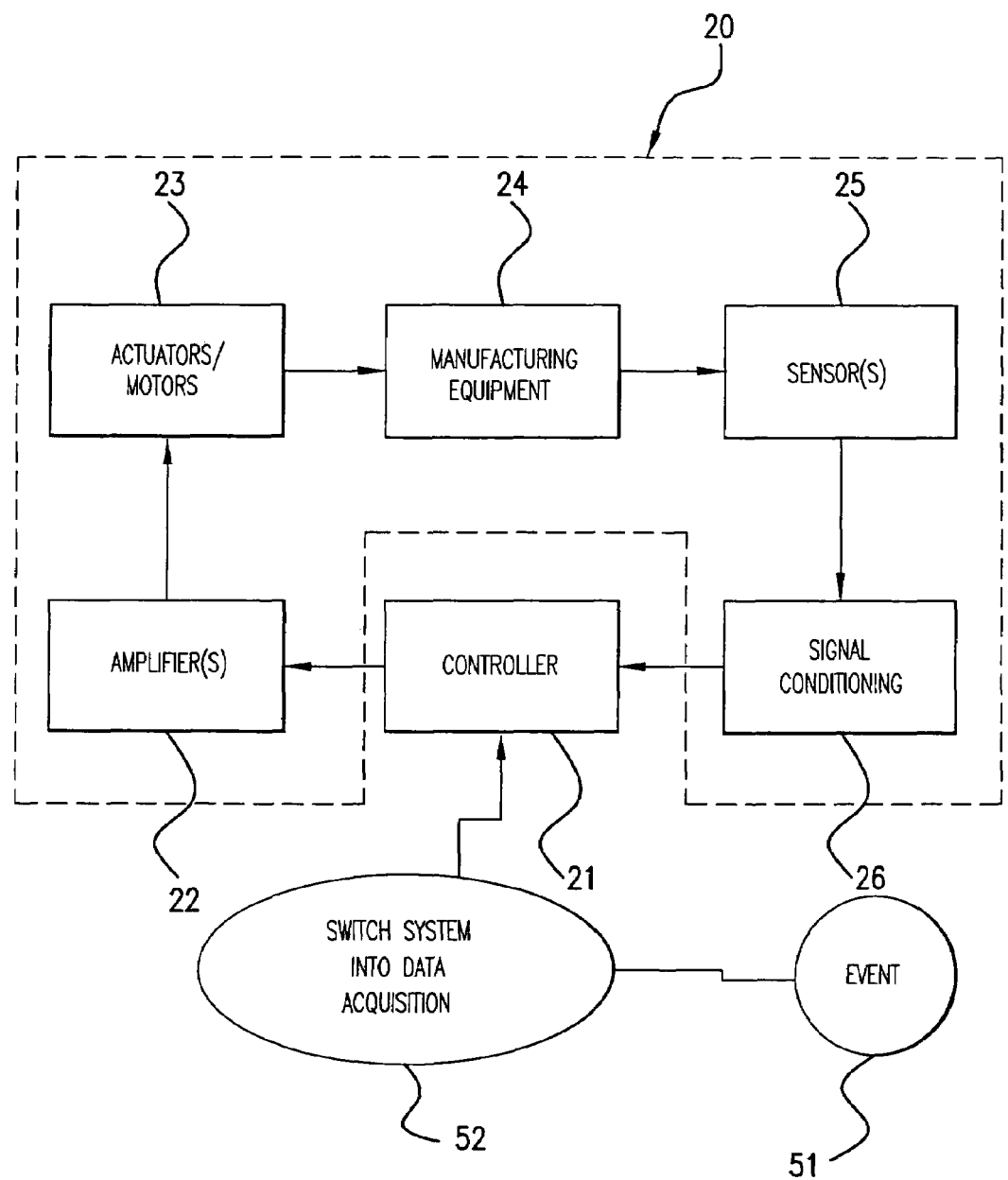
FIGS. 2, 3, 4 are block diagrams illustrating several different embodiments of tuning systems according to the present invention in which the tuning processing is accomplished.
Figure 5:
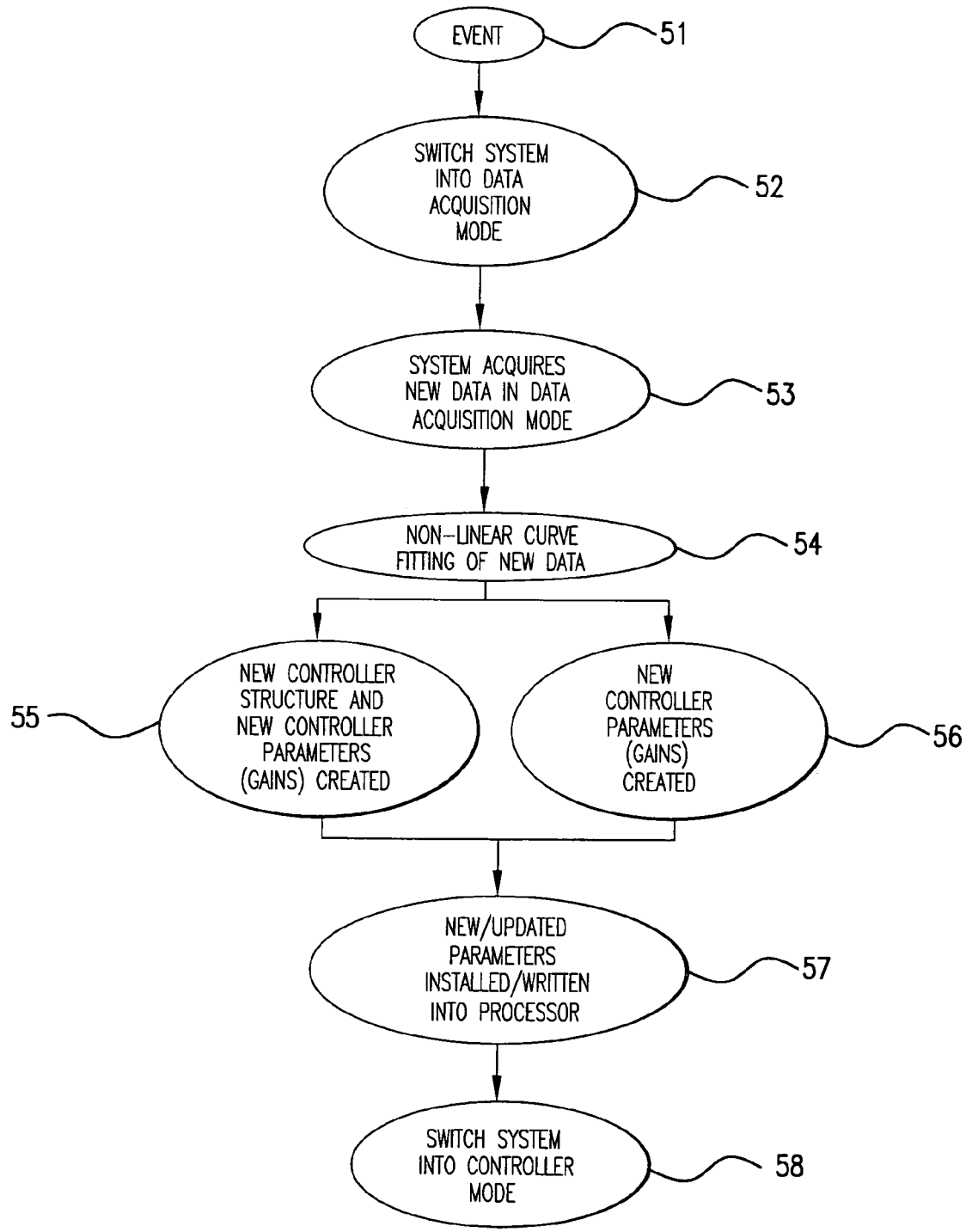
FIG. 5 is a flow chart illustrating embodiments of the invention in which tuning or updating of the controller is performed.

FIG. 2 adds detail to the plant, in this case, manufacturing equipment 20, and shows a procedure by which control parameters can be updated for manufacturing equipment 20, where equipment 20 is shown as including sensor(s) 25, actuators or motor(s) 23 and manufacturing equipment 24. In this embodiment, an event 51 occurs which causes the system to switch the controller 21 into data acquisition mode 52. Events 51 that might initiate this change include a command generated by an operator, a command generated as a result of a clock in communication with the system, or a change in the performance of the system. The clock may be used to generate the above noted command after the passage of a selected (predetermined) time period, and the change in the performance of the system may be measured against an operating value of the system exceeding a selected (predetermined) threshold. In this embodiment, when the controller 21 is placed into data acquisition mode, it generates a drive signal that is applied to amplifier(s) 22, which then applies a signal to the actuators/motors 23. The actuators/motors 23 command some motion or action in the manufacturing equipment 24. The motion of action results in the sensor(s) 25 generating at least one sensor signal that is at least partly responsive to, or indicative of, the motion or action generated by the actuators 23 on the manufacturing equipment 24. The sensor signal is then conditioned by signal conditioner 26 and passed back to the controller 21. At this point, the controller 21 would follow the procedure illustrated in FIG. 5 following the point in which the system acquires new data in data acquisition mode 53.

Figure 3:
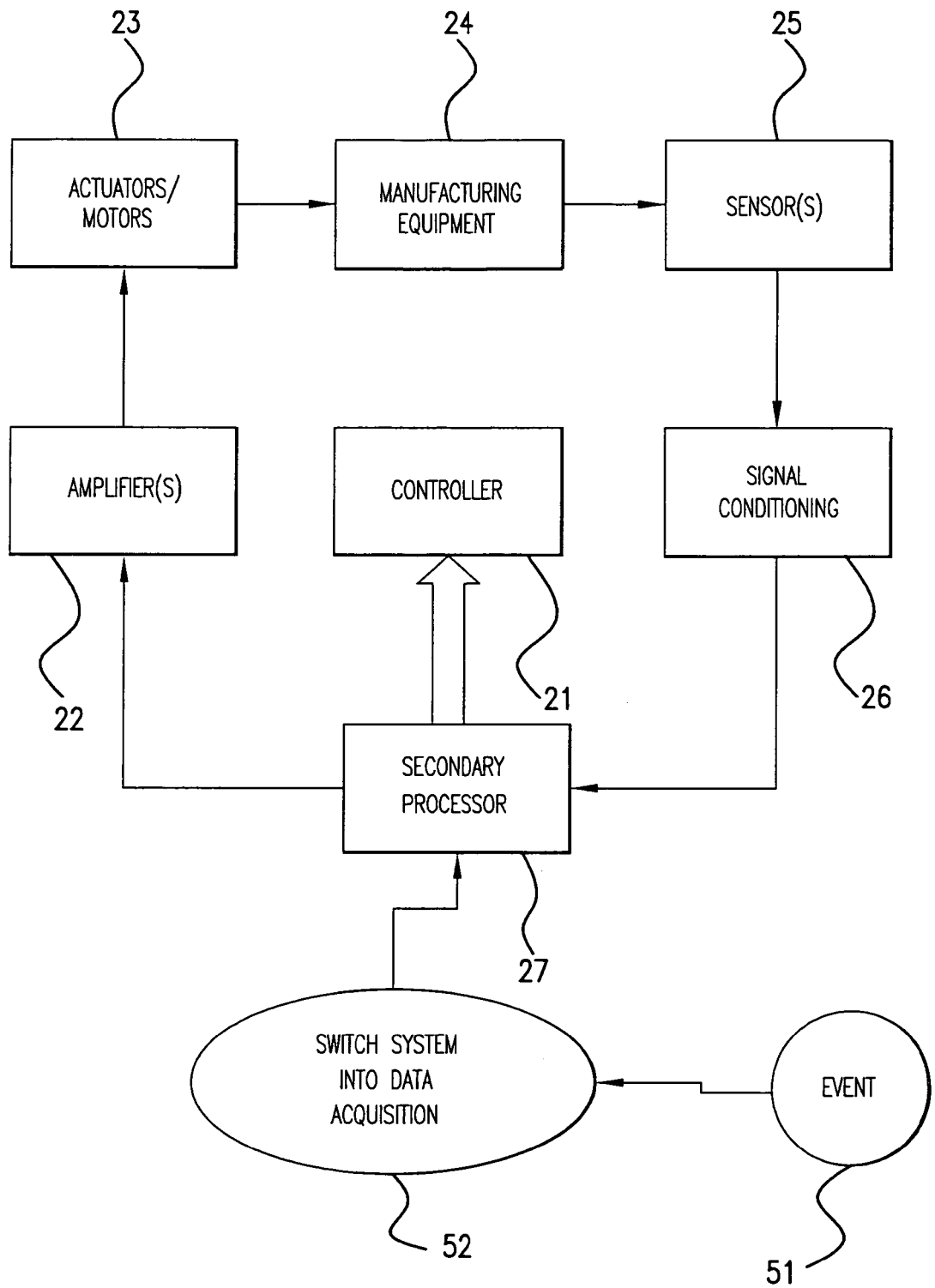

FIG. 3 shows an alternative procedure by which control parameters can be updated for a system or plant 20. In this embodiment an event 51 occurs which causes the system to switch the secondary processor (or a host personal computer PC) 27 into data acquisition mode 52. Events 51 that might initiate this change include a command generated by an operator, a command generated as a result of a clock in communication with the system, or a change in the performance of the system. In this embodiment, when the secondary processor 27 is placed into data acquisition mode it generates at least one signal that is applied to amplifier(s) 22, which then applies at least one signal to the actuators or motors 23. The actuators or motors 23 command some motion or action in the manufacturing equipment 24. The motion or action results in the sensor(s) 25 generating at least one sensor signal that is at least partly responsive to the motion or action generated by the actuators 23 upon the manufacturing equipment 24. The sensor signal is then conditioned and passed back to the processor 27. At this point, the processor 27 would follow the procedure illustrated in FIG. 5 following the point at which the system acquires new data in data acquisition mode 53. Once the new controller or control parameters, 55 or 56, are created according to FIG. 5, secondary processor 27 would write or install the controller or control parameters into processor 21 according to step 57 in FIG. 5. The system would then switch into controller mode 58. The secondary processor may be portable from the location of the system processor.

Figure 4:
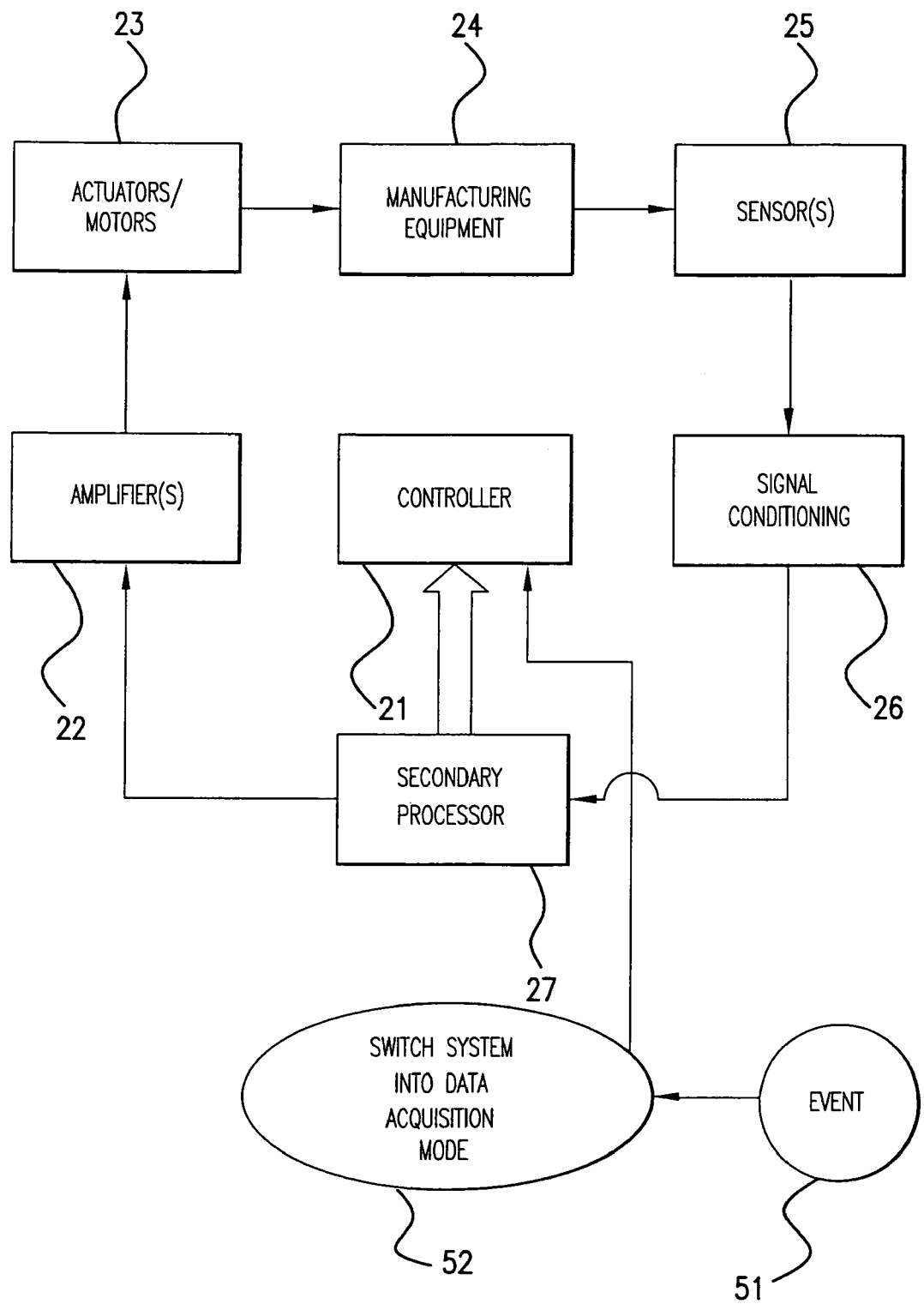

FIG. 4 shows an embodiment of the procedure where an event 51 commands the system to enter data acquisition mode 52. This command to enter data acquisition mode is first communicated to the controller 21 which then communicates with secondary processor 27. Secondary processor 27 then continues with the procedure as described in FIG. 3.

Figure 6:
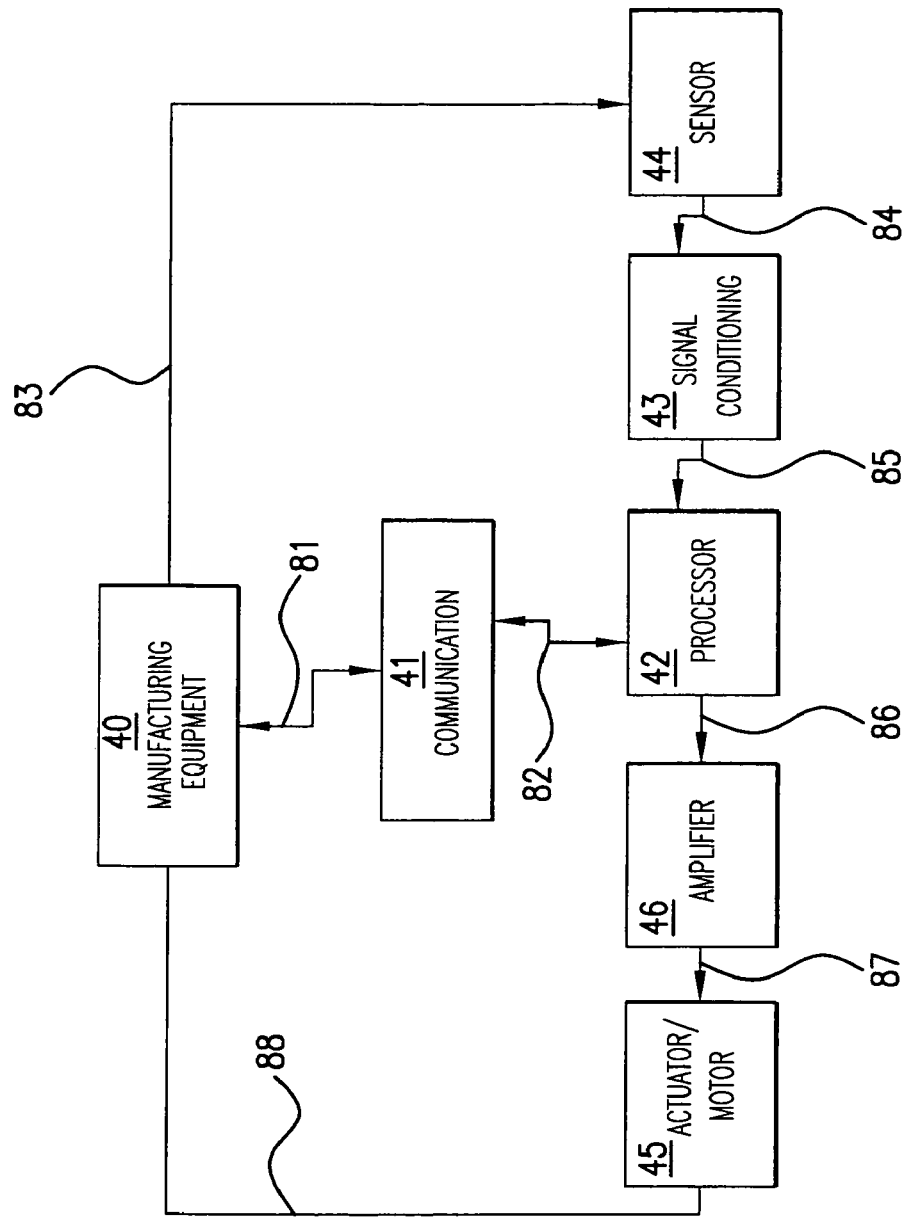
FIG. 6 is a schematic illustration of another embodiment of a control system according to the present invention.

FIG. 6 illustrates one embodiment of a feedback control system that could be used on a piece of manufacturing equipment. In this embodiment, the manufacturing equipment 40 sends a signal 81 to a communication module 41. The module 41 then sends the signal to the processor 42. This signal may correspond to the event 51 that is described as part of FIG. 5. The processor 42 then sends a signal 86 to amplifier 46 that then sends a signal 87 to the actuator/motor 45. Actuator/motor 45 then acts on the manufacturing equipment 40 with a signal 88. A sensor 44 then measures the behavior of the manufacturing equipment 40 due to the effect the actuator/motor has upon the manufacturing equipment 40 indicated by signal 83. The sensor 44 then sends a signal to signal conditioning unit 43. Signal conditioning unit 43 then sends signal 85 to the processor. By way of example, processor 42 might be Model SBC67 supplied by Innovative Integration Inc. with offices in Simi Valley, Calif. This processor is a high performance stand-alone digital signal processor single board computer featuring analog input and output capability.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A system for controlling the physical behavior of an apparatus, the behavior of the apparatus estimated by an initial behavioral model, the system comprising:
   a sensor element located in proximity to the apparatus for acquiring data that accurately characterizes the physical behavior of a machine component indicative of the physical behavior of the apparatus, the data measuring occurring during an abnormal period triggered by an event, the acquired data being indicative of the behavior of the machine component when in normal use;
   a system processor which includes a tunable controller based on the initial behavioral model, the processor capable of generating a drive signal, estimating a behavioral model, tuning and adjusting the controller and generating a control signal,
   wherein the processor adapts the initial model to an updated model based upon a respective transfer function of the respective acquired data, combines the updated model with a universal filter to create a relation that describes the behavior of the apparatus and creates a controller based on the relation such that the controller is tuned according to the updated model, and
   wherein the control signal generated by the processor according to the controller is used to control the physical behavior of the apparatus.

2. The system of claim 1, wherein the drive signal causes motion in the apparatus.

3. The system of claim 1, wherein the relation is formulated as an optimal control problem.

4. The system of claim 3, wherein the relation is solved by a method chosen from the group of methods consisting of: linear quadratic Gaussian (LQG), H-infinity and µ-synthesis.

5. The system of claim 1, wherein the universal filter includes a set of numbers provided by a user of the system.

6. The system of claim 1, wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

7. The system of claim 1 wherein the controller is a digital signal processor (DSP).

8. The system of claim 1 further comprising a second processor in data communication with the system processor.

9. The system of claim 8, wherein the second processor is portable from the location of the system processor.

10. The system of claim 1, wherein the event is selected from the group of events consisting of: input received from an operator, exceeding a threshold operating value in the apparatus, and the passage of a predetermined length of time.

11. The system of claim 1, further comprising an actuator in electrical communication with the system processor, wherein the drive signal causes activation of the actuator and wherein the actuator is located such that the physical behavior of the apparatus is modified by the activation of the actuator.

12. The system of claim 11, wherein transfer function data is collected between the actuator and the sensor element.

13. The system of claim 12, wherein the sensor element gathers frequency data and wherein the accuracy of the updated model is adjustable as a function of the gathered frequency data.

14. The system of claim 1, wherein the system processor further includes a signal conditioner.

15. The system of claim 1, wherein the system processor further includes a signal amplifier.

16. The system of claim 1, wherein the updated model is a model of minimal order.

17. The system of claim 1, wherein the processor creates the updated model by non-linear curve-fitting thereby describing the updated model by a known mathematical equation according to the data gathered by the sensor.

18. The system of claim 17, wherein an error function is associated with the known mathematical equation, the error function including log magnitude and phase information.

19. The system of claim 18, wherein the logarithmic error between the collected data and the initial behavioral model is:

$$\hat{\theta} = \arg\min_{\theta} \sum_{i=1}^{p} \sum_{j=1}^{q} \sum_{k=1}^{N} \left| \log\left( \frac{\hat{G}_{ij}(f_k, \theta)}{G_{jk}(f_k)} \right) \right|^2$$

where θ is a vector of parameters which describe the model, $\hat{G}_{ij}(f_k, \theta)$ is the frequency response of the model from actuator j to sensor i measured at frequency $f_k$, $f_k$, $G_{jk}(f_k)$ is the measured frequency response from actuator j to sensor i measured at frequency $f_k$, p is the number of sensors, q is the number of actuators, and N is the number of frequency points of interest.

20. A system for controlling the physical behavior of an apparatus, the behavior of the apparatus estimated by an initial behavioral model, the system comprising:
   a sensor element located in proximity to the apparatus for acquiring data indicative of the physical behavior of a machine component of the apparatus;
   a system processor which includes a tunable controller based on the initial behavioral model, the processor capable of generating a drive signal, estimating a behavioral model, tuning and adjusting the controller and generating a control signal, wherein the processor adapts the initial model to an updated model based upon a respective transfer function of the respective acquired data, combines the updated model with a universal filter to create a relation that describes the behavior of the apparatus and creates a controller based on the relation such that the controller is tuned according to the updated model, wherein the control signal generated by the processor according to the controller is used to control the physical behavior of the apparatus; and wherein the relation is a multivariable and fully coupled.

21. The system of claim 20, wherein the processor creates the updated model by non-linear curve-fitting thereby describing the updated model by a known mathematical equation according to the data gathered by the sensor.

22. The system of claim 21, wherein an error function is associated with the known mathematical equation, the error function including log magnitude and phase information.

23. The system of claim 20, wherein the logarithmic error between the collected data and the initial behavioral model is:

$$\hat{\theta} = \underset{\theta}{\operatorname{argmin}} \sum_{i=1}^{p} \sum_{j=1}^{q} \sum_{k=1}^{N} \left| \log\left( \frac{\hat{G}_{ij}(f_k, \theta)}{G_{ik}(f_k)} \right) \right|^2,$$

where $\theta$ is a vector of parameters which describe the model, $\hat{G}_{ij}(f_k, \theta)$ is the frequency response of the model from actuator j to sensor i measured at frequency $f_k$, $G_{ik}(f_k)$ is the measured frequency response from actuator j to sensor i measured at frequency $f_k$, p is the number of sensors, q is the number of actuators, and N is the number of frequency points of interest.

24. A system for governing a controller usable to dictate motion of a machine component in normal use, comprising: a sensor which measures data that accurately characterizes the physical behavior of the component, the data measuring occurring during an abnormal period triggered by an event, a respective transfer function of the respective measured data being indicative of the behavior of the machine component when in normal use; and a signal processor which dynamically generates and uses a multivariable, fully-coupled mathematical relation of minimal order in conjunction with a universal filter to create a controller, the controller dictating motion after the abnormal period has ceased and when the equipment component is in normal use.

25. The system of claim 24, wherein the mathematical relation provides an accurate model of the normal motion characteristics of the equipment component and the controller is created by using a method chosen from the group of methods consisting of: linear quadratic Gaussian (LQG), H-infinity and μ-synthesis.

26. The system of claim 25, wherein the mathematical relation includes at least one parameter for governing the controller and wherein the parameter is a function of data measured by the sensor.

27. A method for governing motion in a physical system, the physical system being estimated by an initial behavioral model, comprising the steps of inducing motion in the physical system;

measuring frequency data and utilizing the frequency data to create a respective transfer function of the respective frequency data which accurately characterizes a physical behavior of the system, comprising the motion in the system, indicative of the physical behavior of the system, the data measuring occurring during an abnormal period triggered by an event, the measured data being indicative or the behavior of the machine component when in normal use;

updating the initial behavioral model to create an updated behavioral model which accurately conforms to the measured data, using the updated behavioral model in conjunction with a universal filter to create a command structure and applying appropriate stimulus to the system to cause motion in the physical system, thereby causing the physical system to behave in accordance with the command structure.

28. A method for creating an updated model for the motion characteristics of a physical system from a previously stored model of the system, the updated model governing the actions of a system controller which dictates motion in the physical system, comprising the steps of: detecting the occurrence of start event; gathering data relating to the motion characteristics of the physical system during an abnormal period of operation after the start event; updating the stored model by comparing the a respective transfer function of the respective gathered data to the stored model; and iteratively adapting the stored model until the stored model predicts the motion characteristics of the system according to the gathered data; and storing the updated model at an electronic memory location accessible to the system controller.

29. The method of claim 28, wherein the step of gathering data comprises acquiring a frequency response to an induced motion to the physical system.

30. The method of claim 28, wherein the step of comparing the gathered data comprises fitting a non-linear curve to the gathered data.

31. A method for controlling movement of a mechanical apparatus based on the spatial location of a movable portion of the mechanical apparatus, the movement of the portion initially estimated by a first mathematical model and governed by a first controller which is based on the first mathematical model and a universal filter, comprising the steps of:

measuring frequency data and creating a respective transfer function of the respective frequency data, which accurately characterizes a physical behavior of the apparatus, comprising the motion in the system, indicative of the physical behavior of the apparatus, the data measuring occurring during an abnormal period triggered by an event, the measured data being indicative of the behavior of the machine component when in normal use;

introducing a first signal to induce motion in the movable portion;

measuring the motion and spatial location of the movable portion in response to the first signal;

updating the first mathematical model to generate a second mathematical model which approximates the motion of the movable portion and updating the first controller using the second mathematical model and the filter to create and solve an optimal control problem and thereby generate a second controller, such that the motion induced when a second signal is applied to the mechanical apparatus is well-predicted.

32. A method of creating a controller employed by a user to govern motion in a physical system comprising the steps of: generating an identification of the system by measuring the response of the system to commands and creating a respective transfer function for the respective measured response; accepting input from the user specifying certain parameters of the system; applying a universal filter to the input from the user to create a user-defined behavioral range for the physical system; creating a problem specification from the identification of the system and the behavioral range; and solving the problem specification, thereby creating the controller.

33. A system for creating a controller used by a user to govern motion in a physical system comprising: means for generating an identification of the system by measuring the response of the system to commands and creating a respective transfer function for the respective measured response; means for accepting input from the user specifying certain parameters of the system; means for applying a universal filter to the input from the user to create a user-defined behavioral range for the physical system; means for creating a problem specification from the identification of the system and the behavioral range; and means for solving the problem specification, thereby creating the controller.

34. A system for controlling the physical behavior of an apparatus, the behavior of the apparatus estimated by an initial behavioral model, the system comprising:
 a sensor element located in proximity to the apparatus for acquiring data indicative of the physical behavior of a machine component of the apparatus, which accurately characterizes a physical behavior of the apparatus, comprising the motion in the apparatus, indicative of the physical behavior of the system, during a period when the apparatus is not in normal operation;
 a system processor which includes a tunable controller based on the initial behavioral model, the processor capable of generating a drive signal, estimating a behavioral model, tuning and adjusting the controller and generating a control signal,
 wherein the processor adapts the initial model to an updated model based upon a respective transfer function of the respective acquired data, combines the updated model with a universal filter to create a relation that describes the behavior of the apparatus and creates a controller based on the relation such that the controller is tuned according to the updated model, and
 wherein the control signal generated by the processor according to the controller is used to control the physical behavior of the apparatus.

35. A system for governing a controller usable to dictate motion of a machine component in normal use, comprising: a sensor which measures data that accurately characterizes the physical behavior of the component, the data measuring occurring during an abnormal period triggered by an event during which the physical behavior of the component is stimulated by preselected control signals, a respective transfer function of the respective measured data being indicative of the behavior of the machine component when in normal use, under the influence of the preselected control signals; and a signal processor which dynamically generates and uses a multivariable, fully-coupled mathematical relation of minimal order in conjunction with a universal filter to create a controller utilizing the respective transfer functions, the controller dictating motion after the abnormal period has ceased and when the equipment component is in normal use.

36. A method for governing motion in a physical system, the physical system being estimated by an initial behavioral model, comprising the steps of:
 inducing motion in the physical system during a period when the physical system is not in normal operation;
 measuring frequency data and creating a respective transfer function of the respective frequency data, which accurately characterizes a physical behavior of the apparatus, comprising the motion in the system; indicative of the physical behavior of the apparatus, the data measuring occurring during an abnormal period triggered by an event, the transfer function of the respective measured data being indicative of the behavior of the machine component when in normal use;
 updating the initial behavioral model utilizing the respective transfer function to create an updated behavioral model which accurately conforms to the measured data;
 using the updated behavioral model in conjunction with a universal filter to create a command structure; and
 applying appropriate stimulus to the system to cause motion in the physical system, thereby causing the physical system to behave in accordance with the command structure.

37. A method for creating an updated model far the motion characteristics of a physical system from a previously stored model of the system, the updated model governing the actions of a system controller which dictates motion in the physical system, comprising the steps of: detecting the occurrence of a start event; gathering data relating to the motion characteristics of the physical system during an abnormal period based upon preselected induced control signals, and creating a respective transfer function of the respective gathered data; updating the stored model by comparing the respective transfer function of the respective gathered data to the stored model; and iteratively adapting the stored model until the stored model predicts the motion characteristics of the system according to the gathered data; and utilizing a universal filter and the adapted stored model creating a relation that describes the behavior of the physical system.

38. A method for controlling movement of a mechanical apparatus based on the spatial location of a movable portion of the mechanical apparatus, the movement of the portion initially estimated by a first mathematical model and governed by a first controller which is based on the first mathematical model and a mathematical filter, comprising the steps of:
 introducing a first signal to induce motion in the movable portion during a period of time when the mechanical apparatus is not in normal operation;
 measuring data and creating a respective transfer function of the respective measured data, which accurately characterizes a physical behavior of the apparatus, comprising the motion and spatial location of the movable portion in response to the first signal which accurately characterizes a physical behavior of the apparatus, comprising the motion in the system indicative of the physical behavior of the apparatus, the data measuring occurring during an abnormal period triggered by an event, the measured data being indicative of the behavior of the machine component when in normal use;
 updating the first mathematical model to generate a second mathematical model which approximates the motion of the movable portion utilizing the respective transfer functions and updating the first controller using the second mathematical model and the filter to create and solve an optimal control problem and thereby generate a second controller, such that the motion induced when a second signal is applied to the mechanical apparatus is well-predicted.

39. A method of creating a controller employed by a user to govern motion in a physical system comprising the steps of: generating an identification of the system by measuring the response of the system to commands during a period of time when the physical system is not in operation based upon preselected commands by creating a respective transfer function for the respective measured response; accepting input from the user specifying certain parameters of the system; applying a universal filter to the input from the user to create a user-defined behavioral range for the physical system; creating a problem specification form the identification of the system and the behavioral range; and solving the problem specification, thereby creating the controller.

40. A system for creating a controller used by a user to govern motion in a physical system comprising: means for generating an identification of the system by measuring the response of the system to commands during a period of time when the physical system is not in normal operation based upon a plurality of preselected commands by creating a respective transfer function for the respective measured response; means for accepting input from the user specifying certain parameters of the system; means for applying a universal filter to the input from the user to create a user-defined behavioral range for the physical system; means for creating a problem specification from the identification of the system and the behavioral range; and means for solving the problem specification, thereby creating the controller.

41. A system for creating a controller used by a user to govern motion in a physical system comprising:
controller means for injecting motion control signals to govern motion in the physical system having feedback to the controller means;
means for disabling the controller means and substituting a temporary control signal generator injecting preselected control signals into the physical system to enable measurement of response to the preselected control signals;
means for generating an update of a preexisting model of the physical system based upon respective transfer functions of the respective measured responses;
means for using the updated model along with a universal filter for generating a new controller means by computing new controller variables; and,
means for connecting the new controller means to the physical system.

42. The apparatus of claim 41 further comprising:
the means for generating a new controller includes means for downloading the computed new controller variables to the existing controller means.

43. The apparatus of claim 42 further comprising:
the new controller variables are controller gains.

44. A method for creating a controller used by a user to govern motion in a physical system comprising:
injecting motion control signals to govern motion in the physical system having feedback to a controller injecting the motion control signals;
disabling the controller and substituting a temporary control signal generator injecting preselected control signals into the physical system to enable measurement of response to the preselected control signals;
measuring data and creating respective transfer functions for the respective measured data, which accurately characterizes a physical behavior of the physical system, comprising the motion of the physical system in response to the motion control signal which accurately characterizes a physical behavior of the physical system, comprising the motion in the physical system indicative of the physical behavior of the physical system, the data measuring occurring during an abnormal period triggered by an event, the measured data being indicative of the behavior of the physical system when in normal use;
generating an update of a preexisting model of the physical system based upon the respective transfer functions for the respective measured responses;
using the updated model along with a universal filter for generating a new controller by computing new controller variables; and,
connecting the new controller to the physical system.

45. The method of claim 44 further comprising:
the step of generating a new controller includes downloading the computed new controller variables to the existing controller.

46. The apparatus of claim 45 further comprising:
the new controller variables are controller gains.

47. A system for controlling the physical behavior of an apparatus, the behavior of the apparatus estimated by an initial behavioral model, the system comprising:
a sensor element located in proximity to the apparatus for acquiring data indicative of the physical behavior of a machine component of the apparatus;
a system processor which includes a tunable controller based on the initial behavioral model, the processor capable of generating a drive signal, estimating a behavioral model, tuning and adjusting the controller and generating a control signal,
wherein the processor adapts the initial model to an updated model based upon the acquired data, combines the updated model with a universal filter to create a relation that describes the behavior of the apparatus and creates a controller based on the relation such that the controller is tuned according to the updated model,
and wherein the control signal generated by the processor according to the controller is used to control the physical behavior of the apparatus; and
wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

48. The system of claim 47, wherein the relation is solved by a method chosen from the group of methods consisting of: linear quadratic Gaussian (LQG), H-infinity and μ-synthesis.

49. The system of claim 47, further comprising an actuator in electrical communication with the system processor, wherein the drive signal causes activation of the actuator and wherein the actuator is located such that the physical behavior of the apparatus is modified by the activation of the actuator.

50. The system of claim 49, wherein transfer function data is collected between the actuator and the sensor element.

51. A system for controlling the physical behavior of an apparatus, the behavior of the apparatus estimated by an initial behavioral model, the system comprising:
- a sensor element located in proximity to the apparatus for acquiring data indicative of the physical behavior of the apparatus;
- a system processor which includes a tunable controller based on the initial behavioral model, the processor capable of generating a drive signal, estimating a behavioral model, tuning and adjusting the controller and generating a control signal,
- wherein the processor adapts the initial model to an updated model based upon a respective transfer function for the respective acquired data, by dynamically generating a multivariable, fully-coupled mathematical relation of minimal order, and combines the updated model with a universal filter to create a relation that describes the behavior of the apparatus and creates a controller based on the relation such that the controller is tuned according to the updated model, and
- wherein the control signal generated by the processor according to the controller is used to control the physical behavior of the apparatus.

52. A method for governing motion in a physical system, the physical system being estimated by an initial behavioral model, comprising the steps of:
- inducing motion in the physical system, measuring frequency data which characterizes the motion in the system;
- updating the initial behavioral model utilizing a respective transfer function for the respective measured frequency data to create an updated behavioral model which accurately conforms to the measured data;
- using the updated behavioral model in conjunction with a universal filter to create a command structure by dynamically generating a multivariable, fully coupled mathematical relation of minimal order; and
- applying appropriate stimulus to the system to cause motion in the physical system, thereby causing the physical system to behave in accordance with the command structure.

53. A method for controlling movement of a mechanical apparatus based on the spatial location of a movable portion of the mechanical apparatus, the movement of the portion initially estimated by a first mathematical model and governed by a first controller which is based on the first mathematical model and a mathematical filter, comprising the steps of:
- introducing a first signal to induce motion in the movable portion;

measuring the motion and spatial location of the movable portion in response to the first signal;
- updating the first mathematical model utilizing a respective transfer function of the respective measured response, to generate a second mathematical model which approximates the motion of the movable portion and updating the first controller using the second mathematical model and the filter by dynamically generating a multivariable, fully coupled mathematical relation of minimal order, to create and solve an optimal control problem and thereby generate a second controller, such that the motion induced when a second signal is applied to the mechanical apparatus is well-predicted.

54. A system for controlling the physical behavior of an apparatus, the behavior of the apparatus estimated by an initial behavioral model, the system comprising:
- a sensor element located in proximity to the apparatus for acquiring data indicative of the physical behavior of machine component of the apparatus during a period when the apparatus is not in normal operation;
- a system processor which includes a tunable controller based on the initial behavioral model, the processor capable of generating a drive signal, estimating a behavioral model, tuning and adjusting the controller and generating a control signal,
- wherein the processor adapts the initial model to an updated model based upon respective transfer function for the respective acquired data, by dynamically generating a multivariable, fully-coupled mathematical relation of minimal order, and combines the updated model with a universal filter to create a relation that describes the behavior of the apparatus and creates a controller based on the relation such that the controller is tuned according to the updated model, and
- wherein the control signal generated by the processor according to the controller is used to control the physical behavior of the apparatus.

55. A method for governing motion in a physical system, the physical system being estimated by an initial behavioral model, comprising the steps of:
- inducing motion in the physical system during a period when the physical system is not in normal operation, measuring frequency data which characterizes the motion in the system;
- updating the initial behavioral model based upon a respective transfer function for the respective acquired data to create an updated behavioral model which accurately conforms to the measured data by dynamically generating a multivariable, fully-coupled mathematical relation of minimal order, and combining the updated behavioral model with a universal filter;
- using the updated behavioral model in conjunction with a universal filter to create a command structure; and
- applying appropriate stimulus to the system to cause motion in the physical system, thereby causing the physical system to behave in accordance with the command structure.

56. A method for controlling movement of a mechanical apparatus based on the spatial location of a movable portion of the mechanical apparatus, the movement of the portion initially estimated by a first mathematical model and governed by a first controller which is based on the first mathematical model and a mathematical filter, comprising the steps of:
- introducing a first signal to induce motion in the movable portion during a period of time when the mechanical apparatus is not in normal operation;
- measuring the motion and spatial location of the movable portion in response to the first signal;
- updating the first mathematical model based upon a respective transfer function for the respective measures response to generate a second mathematical model which approximates the motion of the movable portion by dynamically generating a multivariable, fully-coupled mathematical relation of minimal order, and updating the first controller using the relation and the filter to create and solve an optimal control problem and thereby generate a second controller, such that the motion induced when a second signal is applied to the mechanical apparatus is well-predicted.

57. A method for creating a controller used by a user to govern motion in a physical system comprising:
  injecting motion control signals to govern motion in the physical system having feedback to a controller injecting the motion control signals;
  disabling the controller and substituting a temporary control signal generator injecting preselected control signals into the physical system to enable measurement of response to the preselected control signals;
generating an update of a preexisting model of the physical system based upon a respective transfer function for the respective measured responses by dynamically generating a multivariable, fully-coupled mathematical relation of minimal order;
  using the updated model along with a universal filter for generating a new controller by computing new controller variables; and,
  connecting the new controller to the physical system.

58. A method for governing motion in a physical system, the physical system being estimated by an initial behavioral model, comprising the steps of:
  inducing motion in the physical system, measuring frequency data which characterizes the motion in the system;
  updating the initial behavioral model to create an updated behavioral model which accurately conforms to the measured data;
  using the updated behavioral model in conjunction with a universal filter to create a command structure and applying appropriate stimulus to the system to cause motion in the physical system, thereby causing the physical system to behave in accordance with the command structure;
  wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

59. A method for controlling movement of a mechanical apparatus based on the spatial location of a movable portion of the mechanical apparatus, the movement of the portion initially estimated by a first mathematical model and governed by a first controller which is based on the first mathematical model and a universal filter, comprising the steps of:
  introducing a first signal to induce motion in the movable portion;
measuring the motion and spatial location of the movable portion in response to the first signal;
  updating the first mathematical model to generate a second mathematical model which approximates the motion of the movable portion and updating the first controller using the second mathematical model and the universal filter to create and solve an optimal control problem and thereby generate a second controller, such that the motion induced when a second signal is applied to the mechanical apparatus is well-predicted;
wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

60. A system for controlling the physical behavior of an apparatus, the behavior of the apparatus estimated by an initial behavioral model, the system comprising:
  a sensor element located in proximity to the apparatus for acquiring data indicative of the physical behavior of the apparatus during a period when the apparatus is not in normal operation;
  a system processor which includes a tunable controller based on the initial behavioral model, the processor capable of generating a drive signal, estimating a behavioral model, tuning and adjusting the controller and generating a control signal;
  wherein the processor adapts the initial model to an updated model based upon the acquired data, combines the updated model with a universal filter to create a relation that describes the behavior of the apparatus and creates a controller based on the relation such that the controller is tuned according to the updated model; and
  wherein the control signal generated by the processor according to the controller is used to control the physical behavior of the apparatus;
wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

61. A method for governing motion in a physical system, the physical system being estimated by an initial behavioral model, comprising the steps of:
- inducing motion in the physical system during a period when the physical system is not in normal operation, measuring frequency data which characterizes the motion in the system;
- updating the initial behavioral model to create an updated behavioral model which accurately conforms to the measured data;
- using the updated behavioral model in conjunction with a universal filter to create a command structure and applying appropriate stimulus to the system to cause motion in the physical system, thereby causing the physical system to behave in accordance with the command structure;
- wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

62. A method for controlling movement of a mechanical apparatus based on the spatial location of a movable portion of the mechanical apparatus, the movement of the portion initially estimated by a first mathematical model and governed by a first controller which is bused on the first mathematical model and a mathematical filter, comprising the steps of:
- introducing a first signal to induce motion in the movable portion during a period of time when the mechanical apparatus is not in normal operation;
- measuring the motion and spatial location of the movable portion in response to the first signal; updating the first mathematical model to generate a second mathematical model which approximates the motion of the movable portion and updating the first controller using the second mathematical model and the filter to create and solve an optimal control problem and thereby generate a second controller, such that the motion induced when a second signal is applied to the mechanical apparatus is well-predicted;
- wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

63. A method for creating a controller of the type used by a user to govern motion in a physical system comprising:
- injecting motion control signals to govern motion in the physical system having feedback to a controller injecting the motion control signals;
- disabling the controller and substituting a temporary control signal generator injecting preselected control signals into the physical system to enable measurement of response to the preselected control signals;
- generating an update of a preexisting model of the physical system based upon the measured responses;
- using the updated model along with a universal filter for generating a new controller by computing new controller variables; and,
- connecting the new controller to the physical system;
- wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1 E_2$, and $E_3$ are filters that specify the relationship between at least one performance variable, z, and at least one disturbance, w, at least one controller output, u, and at least one plant output, s, and $F_1$ and $D_1$ are filters that specify the relationship between at least one plant input, r, and an least one disturbance, w, and at least one controller output, u, and $F_2$ and $D_2$ are filters that specify the relationship between at least one controller input and at least one disturbance, w, and at least one plant output, s.

64. A system for controlling the physical behavior of an apparatus, the behavior of the apparatus estimated by an initial behavioral model, the system comprising:
- a sensor element located in proximity to the apparatus for acquiring data that accurately characterizes the physical behavior of a machine component indicative of the physical behavior of the apparatus, the data measuring occurring during an abnormal period triggered by an event, the acquired data being indicative of the behavior of the machine component when in normal use;
- a system processor which includes a tunable controller based on the initial behavioral model, the processor capable of generating a drive signal, estimating a behavioral model, tuning and adjusting the controller and generating a control signal,
- wherein the processor adapts the initial model to an updated model based upon the acquired data, combines the updated model with a universal filter to create a relation that describes the behavior of the apparatus and creates a controller based on the relation such that the controller is tuned according to the updated model, and
- wherein the control signal generated by the processor according to the controller is used to control the physical behavior of the apparatus;

wherein the universal filter is $$\begin{bmatrix} z \\ r \\ y \end{bmatrix} = \underbrace{\begin{bmatrix} E_1 & E_2 & E_3 \\ F_1 & D_1 & 0 \\ F_2 & 0 & D_2 \end{bmatrix}}_{F} \begin{bmatrix} w \\ u \\ s \end{bmatrix}$$

where $E_1$, $E_2$, and $E_3$ are filters that specify the relationship between at least one performance variable, z and at least one disturbance, w, at least one controller output, u, and at least one plant output, s, and $F_1$ and $D_1$ are filters that specify the relationship between at least one plant input, r, and at least one disturbance, w, and at least one controller output, u, and $F_2$ and $D_2$ are filters that specify the relationship between at least one controller input and at least one disturbance, w, and at least one plant output, s.

65. A system for controlling the physical behavior of an apparatus, the behavior of the apparatus estimated by an initial behavioral model, the system comprising:
a sensor element located in proximity to the apparatus for acquiring data indicative of the physical behavior of a machine component of the apparatus;
a system processor which includes a tunable controller based on the initial behavioral model, the processor capable of generating a drive signal, estimating a behavioral model, tuning and adjusting the controller and generating a control signal,
wherein the processor adapts the initial model to an updated model based upon the acquired data, combines the updated model with a universal filter to create a relation that describes the behavior of the apparatus and creates a controller based on the relation such that the controller is tuned according to the updated model,
wherein the control signal generated by the processor according to the controller is used to control the physical behavior of the apparatus; and
wherein the relation is a multivariable and fully coupled;
wherein the logarithmic error between the collected data and the initial behavioral model is:

$$\hat{\theta} = \arg\min_{\theta} \sum_{i=1}^{p} \sum_{j=1}^{q} \sum_{k=1}^{N} \left| \log\left(\frac{\hat{G}_{ij}(f_k, \theta)}{G_{jk}(f_k)}\right) \right|^2$$

where θ is a vector of parameters which describe the model, $\hat{G}_{ij}(f_k, \theta)$ is the frequency response of the model from actuator j to sensor i measured at frequency $f_k$, $G_{ik}(f_k)$ is the measured frequency response from actuator j to sensor i measured at frequency $f_k$, p is the number of sensors, q is the number of actuators, and N is the number of frequency points of interest.

66. A system for controlling the physical behavior of an apparatus, the behavior of the apparatus estimated by an initial behavioral model, the system comprising:
a sensor element located in proximity to the apparatus for acquiring data that accurately characterizes the physical behavior of a machine component indicative of the physical behavior of the apparatus, the data measuring occurring during an abnormal period triggered by an event, the acquired data being indicative of the behavior of the machine component when in normal use;
a system processor which includes a tunable controller based on the initial behavioral model, the processor capable of generating a drive signal, estimating a behavioral model, tuning and adjusting the controller and generating a control signal,
wherein the processor adapts the initial model to an updated model based upon the acquired data, combines the updated model with a universal filter to create a relation that describes the behavior of the apparatus and creates a controller based on the relation such that the controller is tuned according to the updated model, and
wherein the control signal generated by the processor according to the controller is used to control the physical behavior of the apparatus;
wherein the processor creates the updated model by non-linear curve-fitting thereby describing the updated model by a known mathematical equation according to the data gathered by the sensor;
wherein an error function is associated with the known mathematical equation, the error function including log magnitude and phase information; and,
wherein the logarithmic error between the collected data and the initial behavioral model is:

$$\hat{\theta} = \arg\min_{\theta} \sum_{i=1}^{p} \sum_{j=1}^{q} \sum_{k=1}^{N} \left| \log\left(\frac{\hat{G}_{ij}(f_k, \theta)}{G_{jk}(f_k)}\right) \right|^2$$

where θ is a vector of parameters which describe the model, $\hat{G}_{ij}(f_k, \theta)$ is the frequency response of the model from actuator j to sensor i measured at frequency $f_k$, $G_{ik}(f_k)$ is the measured frequency response from actuator j to sensor i measured at frequency $f_k$, p is the number of sensors, q is the number of actuators, and N is the number of frequency points of interest.

* * * * *